(12) United States Patent
Pineda

(10) Patent No.: US 8,517,119 B2
(45) Date of Patent: Aug. 27, 2013

(54) DISK FOR FARM USE, PARTICULARLY USED FOR FIELD PLOWING

(75) Inventor: Laurent Pineda, Foix (FR)

(73) Assignee: Forges de Niaux, Niaux (FR)

( * ) Notice: Subject to any disclaimer, the term of this patent is extended or adjusted under 35 U.S.C. 154(b) by 198 days.

(21) Appl. No.: 12/936,944

(22) PCT Filed: Apr. 8, 2009

(86) PCT No.: PCT/FR2009/000413
§ 371 (c)(1),
(2), (4) Date: Oct. 8, 2010

(87) PCT Pub. No.: WO2009/133293
PCT Pub. Date: Nov. 5, 2009

(65) Prior Publication Data
US 2011/0024141 A1    Feb. 3, 2011

(30) Foreign Application Priority Data
Apr. 9, 2008   (FR) ...................................... 08 01944

(51) Int. Cl.
*A01B 59/00*    (2006.01)

(52) U.S. Cl.
USPC .......................................... 172/604; 111/163

(58) Field of Classification Search
USPC .................. 172/604; 111/163, 168; 148/639
See application file for complete search history.

(56) References Cited

U.S. PATENT DOCUMENTS

| | | | | |
|---|---|---|---|---|
| 126,655 A * | 5/1872 | Tuttle | ............................. | 172/604 |
| 488,514 A * | 12/1892 | Arnold | .......................... | 172/604 |
| 662,275 A * | 11/1900 | Kirlin | ........................... | 172/252 |
| 849,329 A * | 4/1907 | Colthar | ........................... | 72/340 |
| 1,077,288 A * | 11/1913 | McKee | .......................... | 172/604 |
| 2,406,553 A * | 8/1946 | Mader | ........................... | 172/599 |
| 2,590,546 A * | 3/1952 | Kincaid et al. | ................ | 148/573 |
| 4,305,272 A | 12/1981 | Johnson | | |
| 4,729,802 A | 3/1988 | Matalis et al. | | |
| 7,631,702 B2 * | 12/2009 | Hansen | .......................... | 172/604 |
| 7,632,175 B2 * | 12/2009 | Freyvogel | ..................... | 451/541 |
| 2006/0283609 A1 | 12/2006 | Hansen | | |

FOREIGN PATENT DOCUMENTS

GB    2155294 A    9/1985

OTHER PUBLICATIONS

International Search Report, dated Nov. 11, 2009, from corresponding PCT application.

* cited by examiner

*Primary Examiner* — Jamie L McGowan
(74) *Attorney, Agent, or Firm* — Young & Thompson

(57) ABSTRACT

This disk is a metal disk comprising a central ductile portion (10), particularly used for attaching the disk to a chassis or the like, and an outer circumferential portion (12), particularly for working on land and having a hardness greater than that of the central portion (10). The disk also has a transitional area (14), between the central portion (10) and the circumferential portion (12), that has a hardness gradient in a radial direction, and at least in the central portion (10), a hardness gradient is present in the body of the disk.

19 Claims, 1 Drawing Sheet

DISK FOR FARM USE, PARTICULARLY USED FOR FIELD PLOWING

Figure 1:
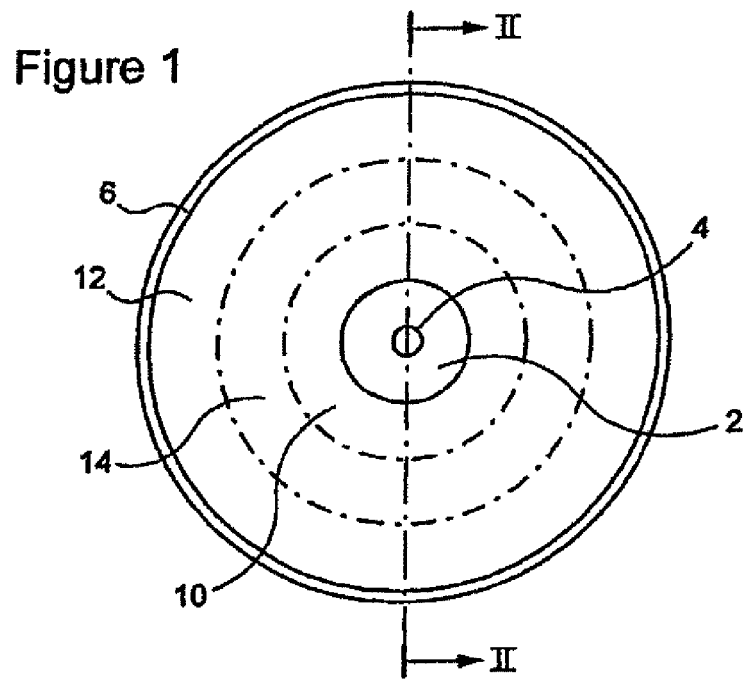

The present invention relates to a disk for agricultural use, especially a disk used for soil preparation.

To prepare soil while limiting its erosion, it is known practice to use disks as a replacement for moldboard plows. The disks are mounted on a frame intended to be placed behind an agricultural tractor, or the like. The disks, which may be flat but also have a concavity, are, in the working position, substantially vertical, possibly inclined, and may pivot about a substantially horizontal axis. Several disks may be mounted, fitted onto a shaft pivoting relative to the frame, or else each disk may be independently mounted, pivoting in relation to bearings.

The disks penetrate the soil on their periphery and thus enable the top layer of the soil to be worked. The shape of the disk periphery and the general shape of the disk are suited to the type of soil and to the type of work to be carried out. Thus, there are disks that are flat, concave, corrugated, etc. with their periphery circular, or toothed, or lobed, etc. Such disks are then mainly used for work such as, for example, plowing, stubble breaking or seeding.

The known disks of the prior art have a central portion that serves for fastening them to their frame and a peripheral portion which is intended to penetrate the soil. The disks are most often made of a steel alloy. This steel undergoes a heat treatment in order to harden it, so as to limit disk wear, especially on its periphery. However, the hardness of the disk is limited so as not to make the disk brittle and to prevent fractures between the central fastening part and the soil-working periphery. Thus, the known disks of the prior art have a hardness generally of between 49 and 53 HRC (degrees of Rockwell hardness), this hardness being uniform throughout the disk. A 49° HRC hardness corresponds to about 1600 MPa or (160 kg/mm$^2$) and a 52° HRC hardness corresponds to about 1750 MPa or (175 kg/mm$^2$) (there is no precise correspondence between hardness measurements in the international system and the Rockwell hardnesses).

Document U.S. Pat. No. 4,305,272 discloses a disk for agricultural use that has an outer edge of higher hardness than the central portion of the disk. This difference in hardness is obtained by a differential heat treatment during which a metal heat-conducting ring is placed on the periphery of the disk. The production method described in the above document is difficult to implement on an industrial scale and, to the knowledge of the Applicant, no disk as described in that document has been marketed. It may relate only to thin steel disks. Furthermore, the disk produced has a greater hardness only on its periphery.

The object of the present invention is to provide a disk which, compared with the disks of the prior art, wears away less quickly without, however, being more brittle, and it has improved characteriztics so as in particular to extend its lifetime. Preferably, the present invention may be implemented on disks of considerable thickness (for example more than 4 mm).

For this purpose, the present invention provides a metal disk intended especially for agricultural use, comprising a ductile central portion serving especially for fastening the disk to a frame, and an outer peripheral portion intended especially for working the soil and having a hardness greater than that of the central portion.

According to the present invention, the disk furthermore has a transition zone, between the central portion and the peripheral portion, which has a hardness gradient in a radial direction and, at least in the central portion, a hardness gradient exists through the thickness of the disk.

The very hard peripheral portion makes it possible to increase the wear-resistance of the disk. The ductile central portion and the transition zone for their part ensure that the disk can bend sufficiently so that it can be highly stressed without fracturing. Furthermore, thanks to the hardness gradient through the thickness of the disk, at least in the central portion, it is possible for the hardness to vary through the thickness of the disk. Thus, for example, the disk may have at the core a very hard zone and on the surface a zone forming a ductile skin that is less hard. It is also possible to envision, for example, one face of the disk to have a greater hardness than the other face of the disk, with a hardness gradient extending from one face to the other through the thickness thereof.

In a disk according to the invention, the difference in hardness between the central portion and the peripheral portion is preferably at least 20 kg/mm$^2$. This difference in hardness between the peripheral portion and the central portion of the disk means that the performance of the disk according to the invention can be substantially enhanced compared with that of a similar disk of uniform hardness.

To promote wear-resistance, the hardness of the peripheral portion is advantageously at least 1900 MPa (or 190 kg/mm$^2$). The hardness of the central portion is advantageously between 1500 and 1700 MPa (or between 150 and 170 kg/mm$^2$) so as to allow the disk to bend sufficiently with the stresses to which it may be subjected and to have a high resistance to fatigue and deformation.

A disk according to the invention may for example be made of a boron-doped steel alloy containing manganese, chromium and silicon. Such an alloy makes it possible, by heat treatment, to obtain the hardnesses proposed above. Advantageously, this alloy comprises between 0.35 and 0.42% carbon and/or less than 0.16% chromium.

In a disk according to the invention the variation in hardness through the thickness of the disk in a zone having a hardness gradient through the thickness may be between 2 and 15 kg/mm$^2$. This hardness gradient through the thickness of the disk is advantageously present both in the central portion of the disk and in the transition zone.

In one embodiment, a disk according to the invention has a flat central zone that is used for fastening it to a frame and is surrounded by a concave zone. In this embodiment, the ductile central portion advantageously extends beyond the flat central zone. In this way, a ductile zone surrounds the part of the disk intended to be fastened to a frame and to be integral therewith.

The present invention relates to all sizes and all shapes of disks for agricultural use. However, the present invention is more particularly suited to disks having a diameter of between 400 and 1100 mm and/or to disks having a thickness of more than 3 mm, preferably more than 4 mm.

The present invention also provides a method for manufacturing a disk as described above, this method comprising following steps:
  production of a blank by cutting a steel plate;
  production of a fastening zone at the center of the blank by punching;
  possible drawing of the blank;
  heat treatment of the part thus obtained by a water or polymer quench operation; and
  tempering at a variable temperature using induction heating means.

The tempering is carried out by heating the part. This tempering is variable-temperature tempering as it does not heat the part uniformly and the temperature reached varies from one zone of the part to the other and through the thickness of the part. By using induction heating means it is possible to control the heating and therefore the temperature in the part. In this way variations in hardness are achieved in the disk obtained by the method according to the present invention.

Figure 2:
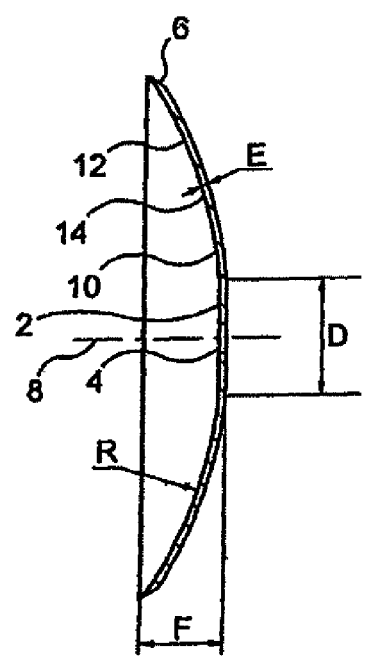

Details and advantages of the present invention will be better understood from the following description, given with reference to the appended schematic drawings in which:

FIG. 1 is a top view of one embodiment of a disk according to the invention, and FIG. 2 is a view in section on the section line II-II of FIG. 1 of the disk shown.

The drawings show a flat-bottomed disk according to the invention for agricultural use. The external shape of this disk is identical to that of a flat-bottomed disk of the prior art. This is a metal disk in the form of a spherical cap with a flat bottom 2. The latter is at the center of the spherical cap and has a diameter D. There are disks for agricultural use that have a shape different from the shape shown in the drawings. The present invention may also relate to these disks of different shapes that can be used in particular for plowing, seeding and/or stubble plowing operations.

The flat bottom 2 has at its center a bore 4 intended for fastening this disk to a frame (not shown). The free edge of the disk, corresponding to the periphery of the disk, has a bevel used for working the soil so as, for example, to chop up crop residue.

In the embodiment shown in the drawings, the disk has an axis of symmetry, which here is also an axis of revolution 8. Between the bevel 6 and the flat bottom 2, the disk has a radius of curvature R and a thickness E. Purely as an indication, the value E may vary between 3.5 and 8 mm. The height of the disk is called F, this being measured along the axis of revolution 8.

In accordance with the present invention, the disk shown has, on the one hand, a hardness that varies with the distance from the axis of revolution 8 and, on the other hand, as explained below, a hardness gradient through the thickness E of the disk in certain zones. So first of all, a radial hardness gradient (variation in hardness relative to the axis of revolution 8) is produced and then a transverse hardness gradient or a hardness gradient through the thickness of the disk.

This disk thus has, along the radial hardness gradient, two portions of different hardnesses and a transition zone. FIG. 1 thus shows a central portion 10 and a peripheral portion 12 that are separated by the transition zone 14. Dot-dash lines illustrate in FIG. 1 the separation between each of the portions 10 and 12 and the transition zone 14. In the embodiment described, the transverse hardness gradient relates to the central portion 10 and the transition zone 14.

The central portion 10 is a ductile zone and the peripheral portion 12 has a greater hardness than the central portion 10. The transition zone 14 for its part has a radial hardness gradient and a transverse hardness gradient.

The central portion 10 serves in particular for fastening the disk to a frame. In the embodiment shown in the drawings, it should be noted that this central portion 10 extends beyond the flat bottom 2. The diameter of the central portion 10 is for example between D+75 mm and D+120 mm.

The hardness of the central portion 10 is for example between 1550 and 1650 MPa (or between 155 kg/mm$^2$ and 165 kg/mm$^2$) at the surface of the disk. This hardness is substantially constant, but it may also vary slightly, possibly increasing from its center to the transition zone 14.

In this central portion 10, the hardness varies through the thickness of the disk. For example, it is possible to have a greater hardness in the core of the thickness of the disk and a lesser hardness at the surface of the disk. The variation in hardness between the core of the thickness of the disk and the surface of the disk is for example between 20 and 150 MPa (or between 2 and 15 kg/mm$^2$), preferably between 30 and 80 MPa (or between 3 and 8 kg/mm$^2$). In this first example, there are therefore two hardness gradients: one from the core of the thickness of the disk toward each of the surfaces of the disk. This first variant is for example suitable for a flat disk (not having a concavity, unlike the disk shown in the drawings), the two faces of which may be made to work in flexion.

According to another example, the hardness varies from one face of the disk to the other: there is therefore only a single transverse hardness gradient from one surface of the disk to the other. The variations in hardness from one face to the other are the same as those indicated for the first example, that is to say they are between 20 and 150 MPa (or between 2 and 15 kg/mm$^2$), preferably between 30 and 80 MPa (or between 3 and 8 kg/mm$^2$).

The variations in hardness through the thickness of the disk depend on the way in which the disk has to work. The face of the disk in the central portion that is subjected to the maximum bending force is the most ductile, with the lowest hardness value. Likewise, it is at the point where the disk works mainly in compression that the greatest hardness will be chosen.

In the peripheral portion 12, the hardness is for example between 2000 and 2100 MPa (or between 200 kg/mm$^2$ and 210 kg/mm$^2$). It is preferably a maximum at the bevel 6. The width of this central portion 12, which is of annular shape, is generally between 50 and 300 mm. The hardness does not vary, or only very little, through the thickness of the disk in this peripheral portion 12.

In the transition zone 14, the harness varies, for example in a substantially linear manner, from the hardness value on the outside of the central portion 10 to the hardness value on the inside of the peripheral portion 12. In the numerical example given above as a non-limiting example, the hardness goes from about 1600 MPa (or 160 kg/mm$^2$) to 2000 MPa (or 200 kg/mm$^2$). This transition zone has, for example, a width of the order of a few centimeters, depending on the external diameter of the disk.

In this transition zone 14, there is a transverse hardness gradient similar to that described for the central portion 10. If the hardness in the central portion is greater than in the core of the thickness of the disk, the hardness in the transition zone 14 will also be greater than in the core of the thickness of the disk. If one face of the central portion 10 is harder than the opposite face, there will again be a similar transverse hardness gradient in the transition zone 14.

Most of the known disks of the prior art have a uniform hardness. This is usually of the order of 1600 MPa (or 160 kg/mm$^2$), which corresponds to about 49° HRc. Compared with such a disk of the prior art, a disk according to the present invention has a very substantially improved wear-resistance and fatigue-resistance. Tests carried out resulted in measured wear-resistance and fatigue-resistance values each time three times greater than the resistance of a disk of the prior art having the same dimensions.

A disk according to the invention is made of steel. The carbon (C) concentration is preferably between 0.35 and 0.42%. This steel is preferably a boron-doped steel that also comprises manganese, chromium and silicon. As regards the chromium (Cr) content, this is advantageously less than 0.20%, preferably less than 0.16%.

There are several manufacturing methods for obtaining a variable hardness on the surface of the disk. A preferred method is described below. According to this method, the disk is firstly produced from a steel (as defined above for example) in the form of a sheet or from a coil. A cutting operation is firstly carried out so as to obtain a blank. The central fastening element is formed by punching. This element makes it possible to connect the disk to a frame. The bore 4 is for example produced by punching. Other embodiments may be envisioned here. Instead of a central bore, several bores may be provided. Next, a bevel blank is produced on the periphery. Here too, depending on the desired shape of the disk, it is possible for example to produce crenellations and/or other shapes on the periphery of the disk. A drawing operation, for example hot drawing, is used to give the blank a concave shape.

Finally, a heat treatment is carried out. This treatment is used to harden the disk. In this instance it is a water or polymer quench. The part obtained therefore has a great hardness. To obtain a ductile central portion 10, a tempering operation is carried out, choosing the tempering temperature according to the zone of the disk. This tempering therefore makes it possible to obtain a lesser hardness at the center and in the transition zone between the central portion 10 and the peripheral portion 12 which has a radial hardness gradient and possibly a transverse hardness gradient. To achieve this result, the part is heated, while controlling the temperature in the various zones of the disk. The central portion 10 will thus be heated more than the peripheral portion 12. Optionally, the latter also undergoes stress relief tempering, so as to eliminate the quenching stresses. A variation in hardness may possibly be observed during this tempering operation in the peripheral zone 12.

By carrying out this tempering operation with the aid of induction heating means, it is possible to produce, on the one hand, the radial hardness gradient by suitably positioning the heating means and by optionally providing cooling means for certain zones and, on the other hand, the transverse hardness gradient described above, for example by varying the frequency of the current used.

One preferred embodiment of the method according to the invention is to temper the entire disk, but it would not be to depart from the scope of the invention to temper only the central portion 10 and possibly also the transition zone 14. The induction heating means allow the disk to undergo variable-temperature tempering with good control of the heating of the disk both according to the radial position in question and through the thickness of the disk. By controlling the heating zones in this way it is possible to control the variations in hardness in the disk both with respect to the radial hardness gradient and the transverse hardness gradient.

A disk according to the invention thus has on its periphery a portion of great hardness, which therefore has a very high wear-resistance. This portion of the disk is intended to come into contact with the soil to be worked and strikes any type of object found in the soil, especially stones.

At the center, the disk is fastened to a frame. This fastening point is likened to an insert and within this fastening point there are few mechanical stresses. The mechanical stresses, especially bending stresses, appear in the portion of the disk which is located between its fastening point and its active portion located in the soil. By virtue of the transverse hardness gradient produced in the central portion (and possibly also in the transition zone), a disk according to the invention also has a better resistance to bending fatigue and to amplitudes of deformation, that is to say by fixing the center of the disk and repeatedly applying a bending load to the periphery of the disk. For disks of similar dimensions, a disk according to the invention will have a substantially greater (up to three times) resistance than a disk of the prior art having a uniform hardness.

The present invention therefore makes it possible to obtain both a greater hardness and a better fatigue resistance, and permits the disk to undergo a greater deformation. These properties, which hitherto seemed conflicting, have been able to be obtained on one and the same disk thanks to the present invention.

The present invention also has the advantage of being applicable to all types of disk: flat, domed or frustoconical disks, colters that are flat and circular or those having corrugations. The center of the disk may be flat, domed, dished, etc. The periphery of the disk may be circular, toothed, crenellated, lobed, etc.

The invention is applicable to disks of any size, but it will be apparent to those skilled in the art that it is more advantageous for large-diameter disks designed to be subjected to higher stresses than small-diameter disks. The invention is thus more particularly, but not exclusively, suitable for disks having a diameter greater than 40 or 50 cm and to disks with a thickness greater than 3.5 or 4 mm.

The present invention is not limited to the preferred embodiment described above by way of a non-limiting example and to the proposed production method. It also relates to all variant embodiments within the competence of those skilled in the art and within the framework of the claims appended hereto.

The invention claimed is:

1. A metal disk intended especially for agricultural use, comprising:
   a ductile central portion (10) serving especially for fastening the disk to a frame, and
   an outer peripheral portion (12) intended especially for working soil and having a hardness greater than that of the central portion (10),
   wherein the disk furthermore has a transition zone (14), between the central portion (10) and the peripheral portion (12), which has a hardness gradient in a radial direction,
   wherein at least in the central portion (10), a hardness gradient exists through a thickness of the disk,
   wherein the hardness gradient in the radial direction in the transition zone is linear, hardness in the transition zone varying in a linear manner from a hardness value on an outside of the central portion to a hardness value on an inside of the peripheral portion.

2. The disk according to claim 1, wherein the difference in hardness between the central portion (10) and the peripheral portion (12) is at least 200 MPa (or 20 kg/mm$^2$).

3. The disk according to claim 1, wherein the hardness of the peripheral portion (12) is at least 1900 MPa (or 190 kg/mm$^2$).

4. The disk according to claim 1, wherein the hardness of the central portion (10) is between 1500 MPa and 1700 MPa (or between 150 and 170 kg/mm$^2$).

5. The disk according to claim 1, wherein the disk is made of a boron-doped steel alloy containing manganese, chromium and silicon and comprising between 0.35 and 0.42% carbon and less than 0.16% chromium.

6. The disk according to claim 1, wherein the variation in hardness through the thickness of the disk in a zone having a hardness gradient through the thickness is between 20 and 150 MPa (or between 2 and 15 kg/mm$^2$).

7. The disk according to claim 1, wherein there is a hardness gradient through the thickness of the disk in the central portion (10) of the disk and in the transition zone (14).

8. The disk according to claim 1, wherein it has a flat central zone (2), which is used for fastening it to a frame and is surrounded by a concave zone, and in that the ductile central portion (10) extends beyond the flat central zone (2).

9. The disk according to claim 1, wherein the disk has a diameter of between 400 and 1100 mm.

10. A method for manufacturing the disk according to claim 1, comprising:
   producing a blank by cutting a steel plate;
   producing a fastening zone at the center of the blank by punching;
   possible drawing of the blank;
   heat treating a part thus obtained by a water or polymer quench operation; and
   tempering at a variable temperature using induction heating means.

11. The disk according to claim 2, wherein the hardness of the peripheral portion (12) is at least 1900 MPa (or 190 kg/mm$^2$).

12. The disk according to claim 2, wherein the hardness of the central portion (10) is between 1500 MPa and 1700 MPa (or between 150 and 170 kg/mm$^2$).

13. The disk according to claim 2, wherein the disk is made of a boron-doped steel alloy containing manganese, chromium and silicon and comprising between 0.35 and 0.42% carbon and less than 0.16% chromium.

14. The disk according to claim 2, wherein the variation in hardness through the thickness of the disk in a zone having a hardness gradient through the thickness is between 20 and 150 MPa (or between 2 and 15 kg/mm$^2$).

15. The disk according to claim 2, wherein there is a hardness gradient through the thickness of the disk in the central portion (10) of the disk and in the transition zone (14).

16. The disk according to claim 2, wherein the disk has a flat central zone (2), which is used for fastening it to a frame and is surrounded by a concave zone, and in that the ductile central portion (10) extends beyond the flat central zone (2).

17. The disk according to claim 1, wherein hardness of the transition zone (14) varies in a substantially linear manner.

18. The disk according to claim 1, wherein the disk having the hardness gradient through the thickness is made from a single metal alloy.

19. The method according to claim 10, wherein tempering at a variable temperature using induction heating means includes:
   heating the peripheral portion (12) at a higher temperature than the transition zone (14);
   heating the transition zone (14) at a higher temperature than the central portion (10).

* * * * *